United States Patent [19]
Stewart

[11] 3,796,892
[45] Mar. 12, 1974

[54] TIMED SHUTDOWN CONTROL CIRCUIT FOR ELECTRIC REFRIGERATION AND AIR CONDITIONING SYSTEMS

[75] Inventor: Robert S. Stewart, Staunton, Va.

[73] Assignee: Westinghouse Electric Corporation, Pittsburgh, Pa.

[22] Filed: Aug. 30, 1972

[21] Appl. No.: 285,392

[52] U.S. Cl............... 307/141.4, 62/158, 307/117, 318/484
[51] Int. Cl......................... H01h 3/34, H01h 33/59
[58] Field of Search...................... 62/158; 318/484; 307/141.4, 117

[56] References Cited
UNITED STATES PATENTS
| | | | |
|---|---|---|---|
| 3,583,173 | 6/1971 | Chesebro | 62/158 |
| 3,707,661 | 12/1972 | King | 62/158 |
| 3,636,369 | 1/1972 | Harter | 62/158 |

Primary Examiner—David Smith, Jr.
Attorney, Agent, or Firm—E. C. Arenz

[57] ABSTRACT

This invention relates to a refrigeration compressor motor control and protection circuit which assures a timed shutdown period of the compressor motor each time the compressor is shut down for any reason. A normally closed starter control contact is positioned in the control circuit so as to immediately initiate a time delay whenever the compressor is deenergized and before the motor can be restarted. A compressor protection contact is arranged in series with the motor starter winding and is adapted to be opened to prevent energization of the winding whenever the time delay is initiated. The control circuit includes a time delay relay which can be instantaneously reset so as to provide a timed shutdown each time the compressor motor shuts off, regardless of how soon the next shutdown should occur.

2 Claims, 1 Drawing Figure

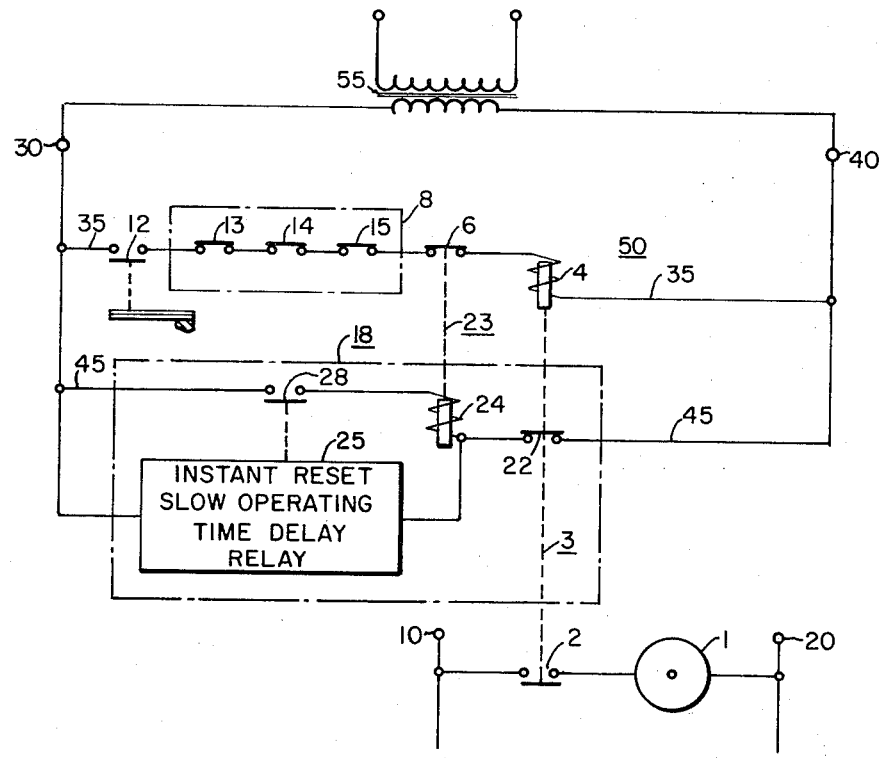

TIMED SHUTDOWN CONTROL CIRCUIT FOR ELECTRIC REFRIGERATION AND AIR CONDITIONING SYSTEMS

CROSS REFERENCE TO RELATED APPLICATIONS

So far as known, this application is not related to any other pending U.S. applications.

BACKGROUND OF THE INVENTION

A refrigeration compressor motor may be shut down for various reasons, including a satisfied room thermostat or operation of any of the condition responsive protective devices, such as the high pressure cutout, the low pressure cutout or the overload relay. The instantaneous and automatic cycling of the compressor with the operation of the above protective devices can lead to mechanical failure of the compressor. For example, a thermostat can chatter by weak contact pressure at the make or break point or from vibrations transmitted within the enclosure being refrigerated. Similarly, an individual can intentionally move the thermostat set point up and down rapidly at will.

It would therefore be desirable to overcome the above difficulties and provide a relatively simple but efficient refrigeration compressor motor control and protection circuit which would prevent rapid cycling of the compressor by causing an immediate timed shutdown period of a predetermined length every time the compressor is deenergized for any reason in order that the pressures between the high and low sides of the compressor will have time to equalize. It would also be desirable that the control circuit will assure both that the compressor motor can not be restarted until the entire time delay has been completed and that a timed shutdown will be initiated the next time the compressor shuts off, regardless of how soon it should occur. It would be further desirable that the time delay control circuit not have conventional timing motors or other expensive electromechanical devices which, through excessive use, could become defective or require frequent attention.

PRIOR ART

Reference may be made to the following U.S. patents which disclose prior arrangements of time delay switches in a protection circuit for an electric refrigeration or air conditioning compressor motor: U.S. Pat. Nos. 3,053,057 to McGrath — issued Sept. 11, 1962; 3,422,633 to Bodett — issued Jan. 21, 1969; 3,583,173 to Chesebro — issued June 8, 1971.

SUMMARY OF THE INVENTION

A control system for a refrigeration compressor is disclosed. The control system includes a motor starter which can connect the motor to a relatively high electric voltage source and a protection circuit for energizing the motor starter. The protection circuit may include a thermally responsive demand switch and at least one overload switch which can sense an overload condition and thereafter open the protection circuit and deenergize the motor starter.

A time delay control circuit is also employed to control the restarting of the compressor motor. The time delay circuit includes a normally closed starter control contact adapted to electrically connect the time delay circuit to a relatively low electric voltage source so as to be activated whenever the motor starter is deenergized. A normally closed compressor protection contact is electrically connected in series with the motor starter and can be opened by the time delay circuit to prevent the energization of the motor starter for a predetermined interval after each opening of the motor starter circuit. An instant reset, time delay relay in the control circuit is operative in response to the deenergization of the motor starter, and only after a predetermined time has elapsed, will the protection contact be closed to condition the motor starter to become energized.

BRIEF DESCRIPTION OF THE DRAWINGS

The figure represents an electrical schematic of the protection and control circuit of the instant invention with the compressor motor shut down and the time delay control circuit about to be activated.

DESCRIPTION OF THE PREFERRED EMBODIMENT

Relating to the figure, a protection and control circuit is illustrated for providing a timed shutdown period for an electric refrigeration or air conditioning compressor motor whenever the compressor is shut down for any reason. Compressor motor 1, which may be either of the well known open or hermetic types, is adapted to be connected and energized for operation from relatively high voltage source terminals 10 and 20 by means of the motor starter and protection circuit, generally shown at 50. The motor starter includes a conventional motor starter relay 3 and its associated contactor winding 4, a normally open switch contact 2, which is closed by the energizing of motor contactor winding 4 and the activation of relay 3 to thereby connect motor 1 to the high voltage terminals, a compressor motor demand switch 12, and a plurality of condition responsive safety switch devices 8.

The motor starter contactor winding 4 in line 35 is connected to and energized from the relatively low voltage source terminals 30 and 40 of a suitable source of power, such as step down transformer 55. The plurality of condition responsive safety switch devices 8 are positioned in series with winding 4 to sense an overload condition and thereupon deenergize the winding 4 by disconnecting it from line 35 should an overload condition exist. Typical examples of overload devices which may be employed as part of the protection circuit, but which are not restricted thereto, include a normally closed high pressure cutout switch 13, a normally closed low pressure cutout switch 14, and a normally closed compressor motor overload relay switch contact 15. The compressor motor demand switch 12, which as illustrated, may be an air conditioner thermostat switch, is closed to start the compressor motor and the cooling operation by energizing contactor coil 4 and thereby closing switch contact 2.

In accordance with the instant invention, a time delay control circuit, generally designated by 18, is provided and will be activated to prevent rapid cycling of the compressor while assuring an immediate timed shutdown everytime contactor winding 4 is deenergized to shut down the compressor, as explained above. A normally closed, starter control contact 22, connected in line 45, is adapted to be immediately closed by action of relay 3 upon the deenergization of contactor winding 4 to electrically connect the time delay control circuit 18 to power source 55 for activation thereby. As illustrated by the figure, thermostatic demand switch 12, is opened, indicating a satisfied cooling operation and, accordingly, line 35 is disconnected from the source of power 55. Motor contactor winding 4 will therefore become deenergized and contact 22 closed to activate the time delay control circuit 18.

Time delay control circuit 18 includes a compressor protection control relay 23 and its associated energization winding 24 and an instant reset, slow operating time delay relay 25 and a respective normally closed timer relay contact 28 positioned in series with compressor protection control relay winding 24. Electrically connected in series with motor contactor winding 4 in line 35 is a normally closed, relay responsive compressor protection control relay contact 6 which is conditioned to be opened by means of the time delay control circuit 18. As the time delay control circuit is activated after the closing of contact 22, the slow operating, time delay relay 25 will become energized by power source 55. Compressor protection control relay winding 24 will also become energized through normally closed timer relay contact 28 and open its respective protection contact 6, thereby open circuiting line 35 between motor contact winding 4 and power source 55. Contactor winding 4 cannot be reenergized to start the compressor motor 1 until the time delay has been completed and protection contact 6 is subsequently closed (as will be explained more fully hereinafter).

Activation of time delay control circuit 18 will initiate a predetermined timing cycle to prevent the compressor from immediately recycling should an overload condition be remedied before such a time has elapsed as may be necessary to insure that the pressures between the high and low sides of the compressor have had time to equalize. It has been found that generally a time delay of about three minutes is required for the equalization of pressures to occur. Preferably, an instant reset time delay relay, diagrammatically shown at 25, such as the solid state relay manufactured by RBM Controls-type 187, may be used for maintaining the appropriate timing cycle.

Only after the complete timing cycle has been terminated, following the initial actuation of the time delay relay 25, will the relay 25 then operate to open contact 28 and deenergize the serially connected compressor protection control relay winding 24. Deenergizing of winding 24 will cause its respective normally closed, protection contact 6 in line 35 to reclose, thereby enabling the motor contact winding 4 to be energized, provided that the condition responsive switch devices 8 are closed. Relay 3 wil then close contact 2 to start the compressor motor 1, while starter control contact 22 in line 45 will immediately open to deactivate the time delay control circuit 18 and thereby reset the time delay relay 25. As described above, the time delay relay 25 is of the type which may be instantly reset upon deenergization so as to assure that the time delay control circuit 18 can be immediately activated by the next shutdown of the compressor regardless of how soon it should occur.

A time delay and protection circuit has been disclosed which has been found to be a relatively simple but efficient means of assuring a timed shutdown for refrigeration and air conditioner compressor motors. Since the time delay control circuit does not use conventional timer motors or the like, and since the timing mechanism is instantly reset and deenergized when the compressor motor is operated, which consequently minimizes the duty cycle of the mechanism, the disclosed time delay control means is both reliable and relatively attention free. Although electromechanical motor starter means have been described in the preferred embodiment, it is within the scope of the instant invention to alternately employ solid state or other electronic motor starting means. Other modifications will occur to those skilled in the art.

I claim as my invention:

1. A control system for a refrigeration compressor motor comprising a motor starting means adapted to connect the motor to a relatively high voltage source of electric power, a protection circuit for energizing said starter means including a thermally responsive demand switch and at least one condition responsive switch positioned in the circuit to sense a condition and thereupon open said protection circuit and deenergize the motor starting means and a time delay control circuit including a normally closed starter control contact adapted to electrically connect said time delay circuit to a relatively low voltage source of electric power for activation thereby whenever said motor starting means is deenergized, a compressor protection relay having an energization winding and a respective normally closed protection contact, said respective protection contact electrically connected in series with said motor starter means and adapted to be opened to deenergize the motor starting means each time said protection circuit is opened, and an instant reset time delay relay having a respective normally closed time delay contact electrically connected in series with said protection relay energization winding and adapted to remain closed for a predetermined time interval after each energization of said respective instant reset time delay relay to maintain energization of said protection relay energization winding for a predetermined time to prevent closing of said motor protection contact and energization of said motor starter means for said predetermined time.

2. The invention of claim 1, wherein at least one of said condition responsive switches is connected in a series circuit with said motor starting means.

* * * * *